United States Patent
Shawe

(10) Patent No.: US 8,740,534 B2
(45) Date of Patent: Jun. 3, 2014

(54) FLANGED HILLSIDE WASHER FOR IMPROVED LOAD DISTRIBUTION

(75) Inventor: Norman Dennis Shawe, Jonesburg, MO (US)

(73) Assignee: Tengco, Inc., Jonesburg, MO (US)

( * ) Notice: Subject to any disclaimer, the term of this patent is extended or adjusted under 35 U.S.C. 154(b) by 485 days.

(21) Appl. No.: 12/494,199

(22) Filed: Jun. 29, 2009

(65) Prior Publication Data

US 2009/0320404 A1 Dec. 31, 2009

Related U.S. Application Data

(60) Provisional application No. 61/133,394, filed on Jun. 30, 2008.

(51) Int. Cl.
*F16B 43/02* (2006.01)
(52) U.S. Cl.
CPC ................................. *F16B 43/02* (2013.01)
USPC .................................................... 411/537
(58) Field of Classification Search
USPC ............................................ 411/537
See application file for complete search history.

(56) References Cited

U.S. PATENT DOCUMENTS

| | | | | |
|---|---|---|---|---|
| 799,783 A * | 9/1905 | Ette | ................................ | 411/537 |
| 1,904,296 A * | 4/1933 | Royse | ........................... | 411/538 |
| 1,937,818 A * | 12/1933 | French | ........................... | 411/535 |
| 2,770,161 A * | 11/1956 | Schutte | ........................... | 411/533 |
| 3,438,300 A * | 4/1969 | Blom et al. | ................. | 411/371.2 |
| 4,012,883 A * | 3/1977 | Muller | ............................ | 52/837 |
| D268,094 S * | 3/1983 | Radmaker | ...................... | D8/399 |
| 5,906,466 A * | 5/1999 | Eandi | ............................ | 411/538 |
| 6,217,270 B1 * | 4/2001 | Stager | ............................ | 411/537 |
| 6,565,288 B1 * | 5/2003 | McCallion | ................. | 405/259.5 |

* cited by examiner

Primary Examiner — Flemming Saether
(74) Attorney, Agent, or Firm — William D. Hare, Esq.; McNeely, Hare & War, LLP

(57) ABSTRACT

The invention relates to a flanged hillside washer assembly that is used to mount bracing rods on metal building frames. The flanged hillside washer assembly includes a flange portion and a hillside washer portion. The flange portion has a flat base on one end. an upper surface and a channel passing therethrough. The channel passing through the hillside washer portion and the flange portion has a breadth dimension and a width dimension over its length, the breadth varying over its length, and the width of the channel being substantially constant over at least a portion of its length sufficient to limit widthwise movement of a mating rod within the channel.

20 Claims, 9 Drawing Sheets

FLANGED HILLSIDE WASHER FOR IMPROVED LOAD DISTRIBUTION

CROSS-REFERENCE TO RELATED APPLICATIONS

This application is a utility application claiming priority from U.S. Provisional Application No. 61/133,394 filed on Jun. 30, 2008, the contents of which are incorporated herein in their entirety by reference.

TECHNICAL FIELD

The field of the invention generally relates to a one piece, flanged hillside washer assembly that includes a hillside washer portion and a flange portion to distribute the weight of the cross bracings in a building assembly.

BACKGROUND

Typically, the frames of metal buildings are stabilized with rods or cable braces and held in place with nuts, bolts and washers. Because of the angles involved in the cross-bracing, the threaded portion of the bolt or bracing is at an angle to the beam that it passes through. To provide a flat surface for the nut placed around the threads, a hillside washer is used. For example, referring to prior art FIG. 1, a metal building frame has diagonal rod or cable braces between wall columns 4 and roof purlins 3. Diagonal rod and cable braces stabilize the metal frame of the building from lateral forces exerted against the building frame, effects of loads placed on the frame, and vibrations, as well as helping in construction of the metal framing. Concentrated loads on the rods and metal cable 2 are transferred by hillside washers directly to the columns 4 and roof purlins 3 of the frame 1.

FIG. 2 shows a prior art hillside washer with a rod 7 mounted on a wall column of a wall unit 6 using a hillside washer 8, a flat washer 10 and a nut 11. The other end (not shown) of the rod is bolted diagonally to another wall column or roof purlin. The threaded end 9 of the rod 7 is inserted through a hole or slot formed in the wall column of the wall unit 6 to an extent that permits the threading of the hillside washer 8, the flat washer 10, and the nut 11 on to the end 9 to mount the rod 7 to the wall unit 6. The hillside washer 8 allows for the transfer of the load from the diagonal rod 7 to wall columns of the wall unit 6 through the washer 10 and the nut 11.

FIGS. 3 and 4 illustrate the standard prior art hillside washer 8. The hillside washer 8 defines a nipple or a nub 13 that extends from a flat bottom surface of the hillside washer. In use, the nub 13 is passed through a correspondingly shaped slot formed in the metal building frame when washer 8 is mounted in place against the metal building frame. A curved surface 14 provides a bearing surface for the flat washer 10 to permit attaching the mating rod 7 at a variety of angles to the building frame. The opening 15 on the curved surface 14 permits passing of the rod 7 through the hillside washer 8 at variety of angles. The shape of hillside washer 8 permits it to be oriented so that the flat surface 12 of the hillside washer 8 is positioned against wall columns 4 or roof purlins 3.

One prior art way to distribute the load from the hillside washer is to take a flat plate, drill an opening through the plate, and weld the flat plate to the building frame such that the opening in the plate aligns with the slot in the building frame. The flat base 12 of the hillside washer 8 is positioned against the flat plate such that the opening in the flat plate is collinear with the channel in the hillside washer. The rod 7 then is inserted through the flat plate, hillside washer 8, flat washer 10, and a nut 11 to mount rod 7 to the wall unit 6.

Many of the prior art hillside washers have broad slots or openings along the curved portion. This wide opening will allow the rod 7 to have play in the slot. If this play is undesirable, the builder must use a specialized washer that have an opening to receive the rod but also is shaped such that the specialized washer has a snug fit within the channel. This configuration helps to stabilize and hold the mating rod 7.

U.S. Pat. No. 6,217,270 discloses a flanged hillside washer have a curved hillside portion that has teeth that mates with a specialized, toothed washer. The flanged hillside washer of the '270 patent does not have a smooth upper surface to permit continuous placement of a washer on its surface to optimize load distribution over the washer. In addition, the washer does not have a channel to receive the mating rod in which the channel has a constant width over a length sufficient to prevent widthwise play of the rod within the channel. Finally, the washer of the '270 patent does not have land or solid regions between sidewalls that strengthen the washer to prevent buckling or collapsing of the walls during use. The inventor believes that each of these features, separately or in combination, are important in the operation of an improved hillside washer for improved load distribution.

SUMMARY

In one general aspect, a flanged hillside washer assembly includes a flange portion and a hillside washer portion. The flange portion has a flat base on one end, an upper surface and a channel passing therethrough. The hillside washer portion extends from the upper surface of the flange portion and has a smooth upper curved surface, a pair of side walls extending from the smooth upper curved surface to the upper surface of the flange portion, and a channel passing between a first opening in the curved surface to the channel in the flange portion to form a continuous channel through the flanged hillside washer assembly. The two side walls are positioned on opposite sides of at least one solid region, the solid region defining at least a part of the channel, extend from the curved surface to the upper surface of the flange portion and limit a pivoting movement of a mating rod within the channel.

The flange portion extends outwardly beyond the side walls of the hillside washer portion to define an extended load distribution surface greater than the load distribution surface of the hillside washer portion by itself. The channel passing through the hillside washer portion and the flange portion has a breadth dimension and a width dimension over its length, the breadth varying over its length, and the width of the channel being substantially constant over at least a portion of its length sufficient to limit widthwise movement of a mating rod within the channel.

Embodiments of the flanged hillside washer assembly may include one or more of the following features. For example, the hillside washer may be formed as one unit.

The hillside washer may be formed from a separate hillside washer portion and a separate flange portion with the hillside washer portion attached to the flange portion. The hillside washer portion may be attached to the flange portion using one or more of welding, threading, affixing, and interference fit.

The washer and the flange may be configured to define a continuous channel.

The width of the channel at the portion of its length that limits widthwise movement of a mating rod may be configured to be of a dimension to permit use of a standard mating rod without excessive widthwise movement of the mating rod within the channel.

The smooth curved surface may be free of grooves or indentations along a widthwise dimension. The smooth curved surface may permit continuous positioning of a flat washer along the length of the curved surface.

The solid region may define a portion of the channel that includes a wall portion at an angle to the upper surface of the flange, the angle being sufficiently greater than 0 degrees such that breadthwise pivoting movement of a mating rod within the channel is limited by the wall portion.

The opening in the flat base of the flange portion may be of a breadth that permits a mating rod to pivot within the channel such that the mating rod can be positioned against the wall portion of the solid region.

The substantially constant width of the channel may vary less than 10% over its length.

In another general aspect there is provided a method of using a flanged hillside washer assembly to brace a structure. The method includes providing a flanged hillside washer assembly comprising a flange portion and a hillside washer portion. The flange portion has a flat base on one end, an upper surface and a channel passing therethrough. The hillside washer extends from the upper surface of the flange portion and has a smooth upper curved surface, a pair of side walls extending from the smooth upper curved surface to the upper surface of the flange portion, and a channel passing between a first opening in the curved surface to the channel in the flange portion to form a continuous channel through the flanged hillside washer assembly. The two side walls are positioned on opposite sides of at least one solid region, the solid region defining at least a part of the channel, extending from the curved surface to the upper surface of the flange portion and limiting a pivoting movement of a mating rod within the channel. The flange portion extends outwardly beyond the side walls of the hillside washer portion to define an extended load distribution surface that is greater than the load distribution surface of the hillside washer portion by itself. The channel passes through the hillside washer portion and the flange portion and has a breadth dimension and a width dimension over its length, the breadth varying over its length, and the width of the channel being generally constant over at least a portion of its length sufficient to limit widthwise movement of a mating rod within the channel. The method includes positioning the hillside washer against a metal frame member, passing a mating rod through the metal frame member and the channel in the hillside washer assembly, positioning a nut and an optional flat washer over the mating rod, and threading the nut on a threaded portion of the mating rod to secure the mating rod to the metal frame member.

Embodiments of the method may include one or more of the following features. For example, the hillside washer assembly may be formed as one unit. The hillside washer portion and the flange portion may be configured to define a continuous channel. The width of the channel at the portion of its length that limits widthwise movement of a mating rod may be configured to be of a dimension to permit use of a standard mating rod without excessive widthwise movement of the mating rod within the channel.

The smooth curved surface may be free of grooves or indentations along a widthwise dimension. The smooth curved surface may permit continuous positioning of a flat washer along the length of the curved surface.

The solid region may define a portion of the channel that includes a wall portion at an angle to the upper surface of the flange, the angle being sufficiently greater than 0 degrees such that breadthwise pivoting movement of a mating rod within the channel is limited by the wall portion. The opening in the flat base of the flange portion may be of a breadth that permits a mating rod to pivot within the channel such that the mating rod can be positioned against the wall portion of the solid region.

In another general aspect, there is provided a process for manufacturing a flanged hillside washer assembly. The flanged hillside washer assembly includes a flange portion and a hillside washer portion. The flange portion has a flat base on one end, an upper surface and a channel passing therethrough. The hillside washer extends from the upper surface of the flange portion and has a smooth upper curved surface, a pair of side walls extending from the smooth upper curved surface to the upper surface of the flange portion, and a channel passing between a first opening in the curved surface to the channel in the flange portion to form a continuous channel through the flanged hillside washer assembly. The two side walls are positioned on opposite sides of at least one solid region, the solid region defining at least a part of the channel, extending from the curved surface to the upper surface of the flange portion and limiting a pivoting movement of a mating rod within the channel. The flange portion extends outwardly beyond the side walls of the hillside washer portion to define an extended load distribution surface that is greater than the load distribution surface of the hillside washer portion by itself. The channel passes through the hillside washer portion and the flange portion and has a breadth dimension and a width dimension over its length, the breadth varying over its length, and the width of the channel being generally constant over at least a portion of its length sufficient to limit widthwise movement of a mating rod within the channel. The process includes casting the flanged portion and the hillside washer portion to form the flanged hillside washer assembly as a unitary piece.

The details of various embodiments of the invention are set forth in the accompanying drawings and the description below. Other features and advantages of the invention will be apparent from the description, the drawings, and the claims.

DETAILED DESCRIPTION

The above limitations associated with prior art hillside washers have been recognized and addressed by the inventor who has formed a flanged hillside washers in which a hillside washer and a flange portion are formed as a one piece assembly, such as by casting. The assembly has a channel therethrough in which the channel has a width and a breadth over its length. While the width is constant over a portion of its length to prevent excessive widthwise movement of a mating rod passing therethrough, the breadth can be varied over its length. In this manner, a properly sized rod or bolt passing through the channel will not have excessive widthwise play such that it is loosely mounted. Consequently, an additional, specialized washer is not needed to help stabilize and hold the mating rod. At most, a conventional flat washer need be used with the flanged hillside washer. In addition, because the flange portion is cast or integral with the hillside washer assembly, improved load distribution is achieved while eliminating steps in the assembly of a building frame in which hillside washers are used.

Figure 1:
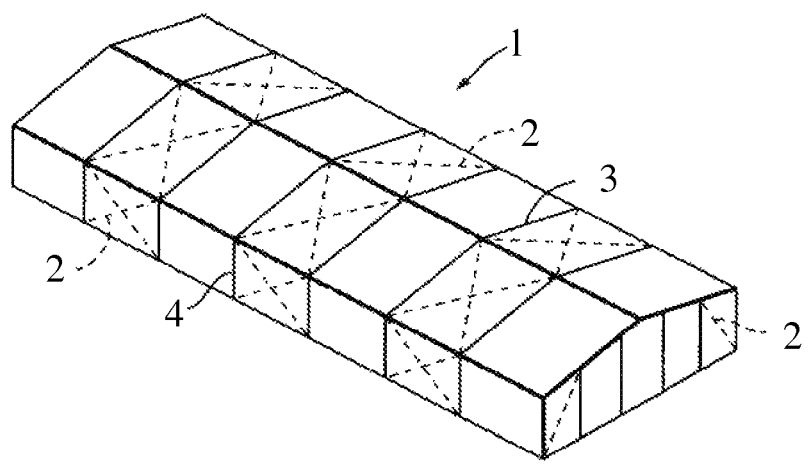
FIG. 1 is a diagrammatic view of a building frame with bracing.
Figure 2:
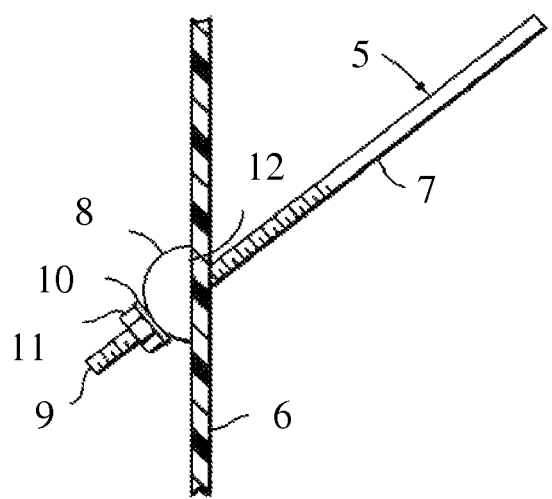
FIG. 2 is a rod bracing employing a prior art hillside washer.
Figure 3:
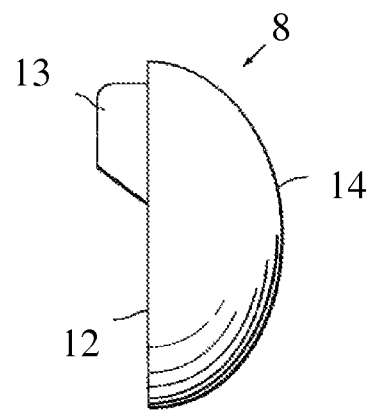
FIG. 3 is a typical prior art hillside washer.
Figure 4:
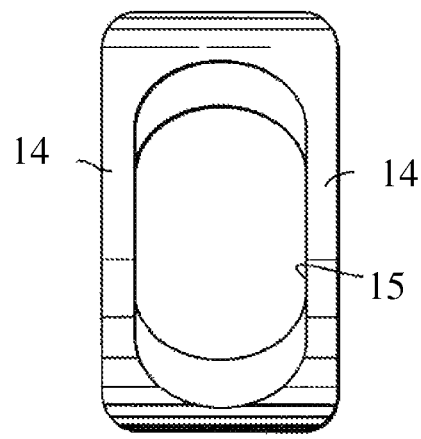
FIG. 4 is a top view of a typical prior art hillside washer.
Figure 5:
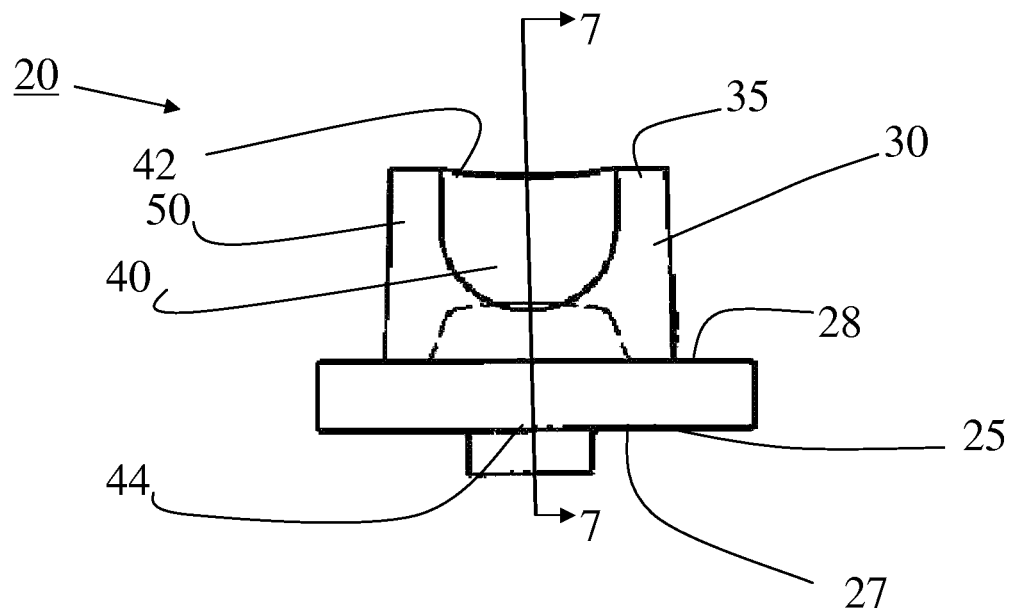
FIG. 5 is a front view of a flanged hillside washer assembly.

Referring to FIG. 5, which shows a front view of a flanged hillside washer assembly 20, the assembly includes a flange portion 25 and a hillside washer portion 30. The flange portion 25 has a flat base 27 on one end, an upper surface 28 on an opposite end, and a channel 40 passing therethrough. The hillside washer portion 30 has an upper curved surface 35 and outer side walls 50 extending downwardly from the curved surface to the upper surface 28 of the flange portion 25. The upper curved surface 35 includes an opening 42 that defines a first end of the channel 40. The channel 40 passes between the first opening 42 in the curved surface and terminates in a second opening 44 at the flat surface 27 of the flange portion such that the channel forms a continuous channel through the flanged hillside washer assembly.

The curved surface 35 is smooth. The smooth surface 35 can be free of indentions, grooves and the like that limit the continuous lengthwise positioning of a washer or nut against the curved surface during use. It should be understood that the indentations or grooves that would limit the continuous lengthwise positioning of the washer or nut are those that would run across the width of the smooth curved surface but not those that would extend lengthwise along the length of the smooth curved surface. Neither widthwise nor lengthwise indentations or grooves are shown in the figures.

Because of the smooth curved surface 35, a user advantageously has continuous lengthwise positioning of a conventional flat washer or nut against the curved surface of the hillside portion and is not limited in the orientation of the mating rod to the washer. In other words, the user is not limited to increments along the length of the curved surface when positioning a washer or nut on the curved surface of the hillside washer. This is advantageous in use of the hillside washer because more precise position of the mating rod can be achieved such that the hillside washer optimally distributes the load over the surface of the flange portion.

Figure 6:
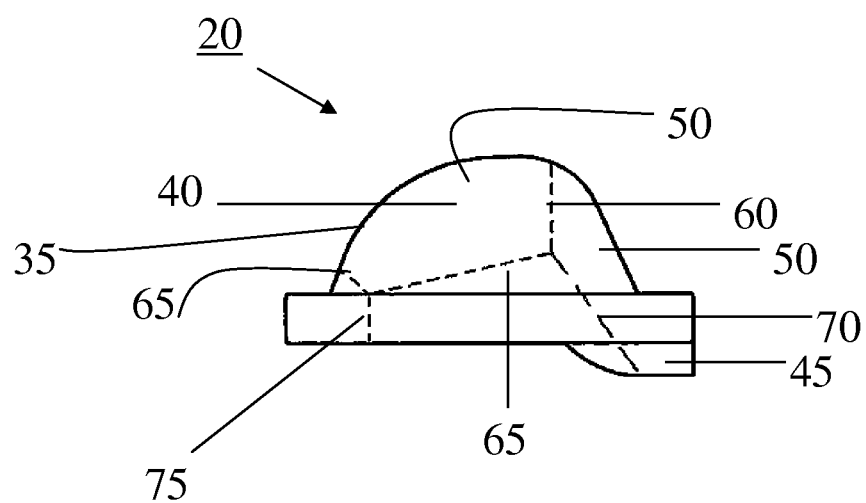
FIG. 6 is a side view of the hillside washer assembly of FIG. 5.

Referring also to FIG. 6, which illustrates a side view of the hillside washer assembly 20, the assembly includes a nipple or a nub 45 that extends downwardly from the flat base 27 of the flange portion 25. In use, the nub 45 fits into and through a slot in the building frame. The nub 45 seats the hillside washer assembly in place in the slot to keep the assembly from further movement along the surface of the building frame. FIGS. 5 and 6 illustrate the nub being positioned at the end of the base 27 with a width that is less than that of the base. In other embodiments, the nub can have a width that is the same as the base.

Figure 7:
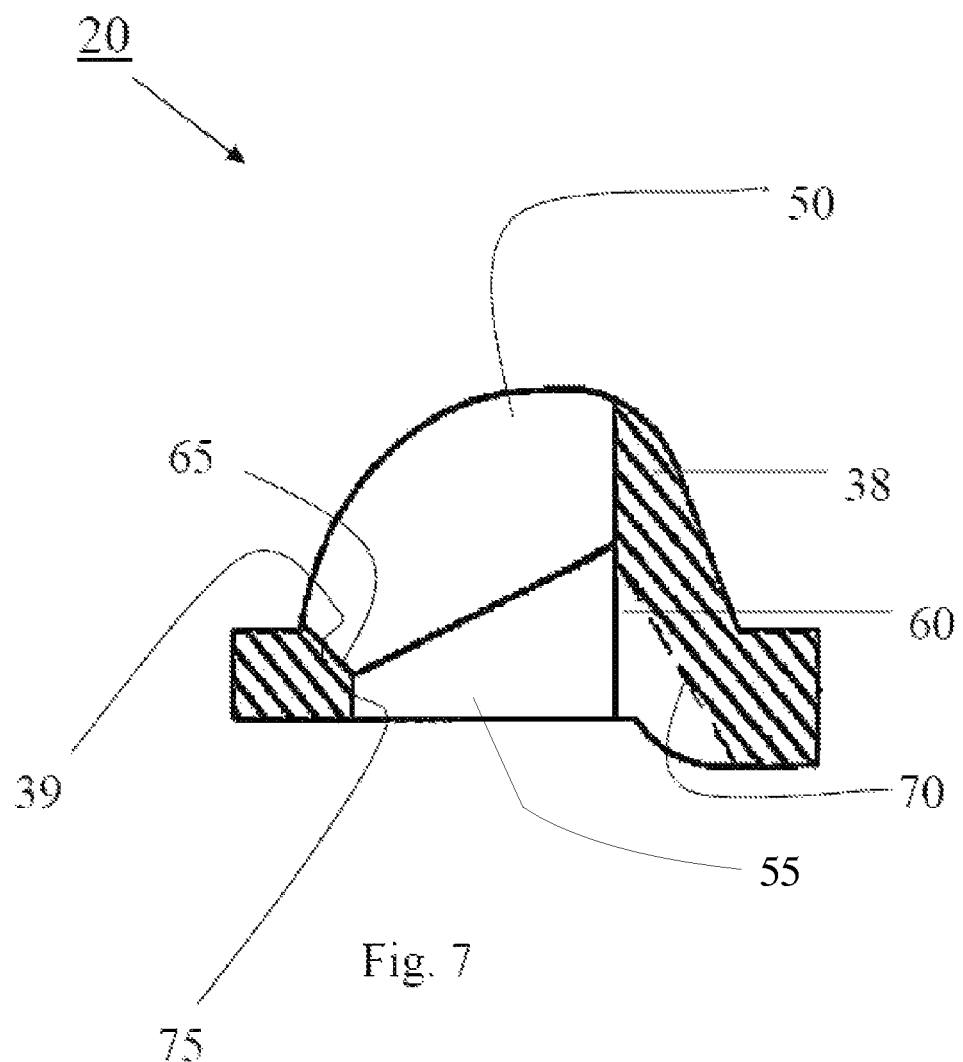
FIG. 7 is a cross sectional side view of the flanged hillside washer assembly of FIG. 6.

FIG. 7 refers to a cross sectional view of the flanged hillside washer assembly in which the channel 40 in the hillside washer assembly 20 has a varying breadth over its length. A varying breadth permits the assembly to have a wider range of pivot motion for a rod passing through the channel. The channel 40 through the hillside assembly has a first portion 50 and a second portion 55. The first potion 50 is generally within the hillside washer portion 30 and the second 55 is generally within the flange portion 25. The first portion 50 of the channel is defined by a first wall 60 and a second wall or surface 65. Although the first wall 60 is generally vertical, the surface 65 is oriented at an angle to the wall 60. In this manner, the breadth of the channel in the first portion is varied.

The second portion 55 of the channel is defined by a first wall 70 and second wall 75. The first wall 70 extends from the wall 60 at an angle away from the wall 60 and the second wall 75. The second wall 75 extends generally vertically from the wall 65. Again, this configuration of the walls 60, 65, 70 and 75 causes a variation in breadth of the channel that permits a rod to pivot within the channel over a wide range.

FIGS. 6 and 7 illustrate that the combination of the side walls 50 and the wall 60 define a first solid region or land 38 of the hillside washer portion and the combination of the side walls 50 and the wall 65 define a second solid region or land 39 of the hillside washer portion. These solid regions 38, 39 advantageously provide support to the side walls 50 to prevent the walls from buckling or otherwise collapsing when great stresses are put upon the side walls during use. For example, if too much stress is placed against the curved surface 35 by use of a nut and washer with too much tension, a conventional hillside washer without such solid regions could buckle or collapse. By using the solid regions, the hillside washer can be made with thinner walls to save materials while still providing a hillside washer that is unlikely to collapse or buckle under typical operating conditions. The solid regions also provide limits to the amount of pivoting movement of a mating rod passing through the slot which advantageously may prevent stressed from being applied to the rod if the angle between the rod and flange portion is too low and the rod is pressed against opposite ends of the opening.

Figure 8:
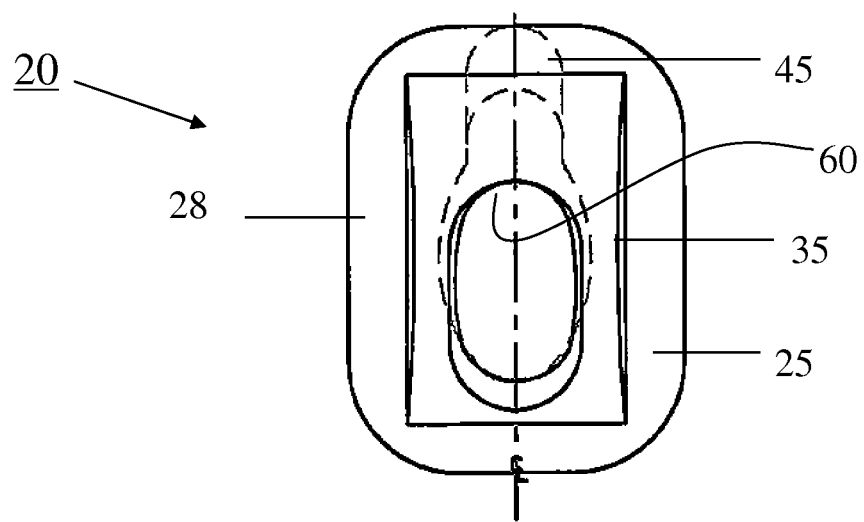
FIGS. 8 and 9 are top and bottom views, respectively, of the flanged hillside washer assembly of FIG. 5.
Figure 9:
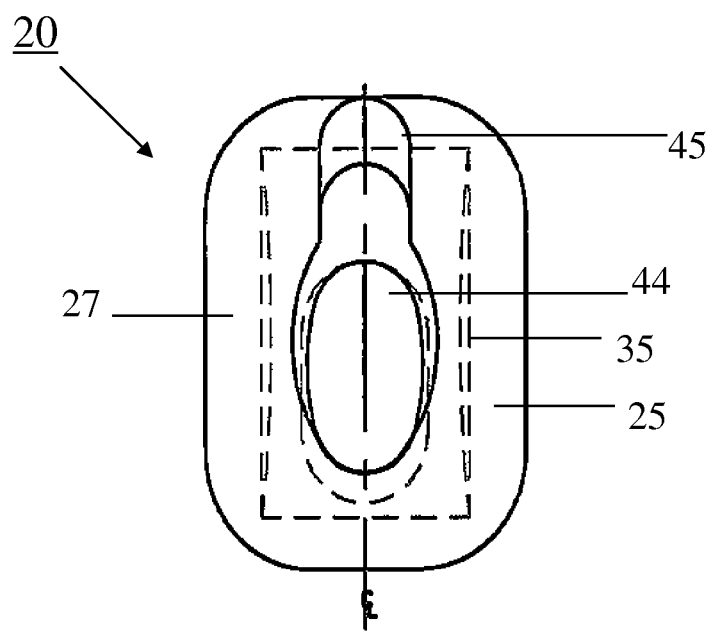

FIGS. 8 and 9 are top and bottom views, respectively, of the hillside washer assembly 20. FIGS. 8 and 9 provide an indication of the vertical configuration of the wall 60, which gives an understanding of the position of the corresponding solid region. The figures also demonstrate the relative sizes of the hillside washer portion 30 and the flange portion 25. The hillside washer portion 30 covers a majority of the surface of the flange portion 25. The figures also illustrate the positioning of the nub 45 extending to the outer edge of the flange portion.

FIGS. 8 and 9 also illustrate the width of the channel being generally or substantially constant over at least a portion of its length sufficient to limit widthwise movement of a mating rod within the channel. As described above, some configurations of the prior art hillside washers had a channel that was open at one or both of the ends such that a mating rod positioned within the channel could have excessive movement within the channel. By arranging the channel to have a substantially constant width over a portion of its length, the constant width portion of the channel prevents the rod from moving in the channel in a widthwise manner such that a second, specialized washer need be used. By creating a tight fit between the channel in the specialized washer and the mating rod, the rod is securely positioned within the prior art hillside washer. The length of the portion of the channel with a constant width can be the entire length of the channel or merely a portion of the length of the channel. Because the objective of requiring a length of the channel to have a substantially constant width, the length of the constant width portion can be varied based on the dimensions of the hillside washer and mating rod to be used with the hillside washer. For example, the width of the channel can be approximately 10% or 5% greater than the diameter of the rod passing through the channel. Similarly, the substantially constant breadth of the channel can vary along its length to a certain degree and remain acceptable for the intended function. For example, one opening to the channel can be 0.69 inches and the opposite opening can be 0.63 inches and be used to receive ½ inch to ⅝ inch mating rods. Such a configuration would have a substantially constant width.

Figure 10:
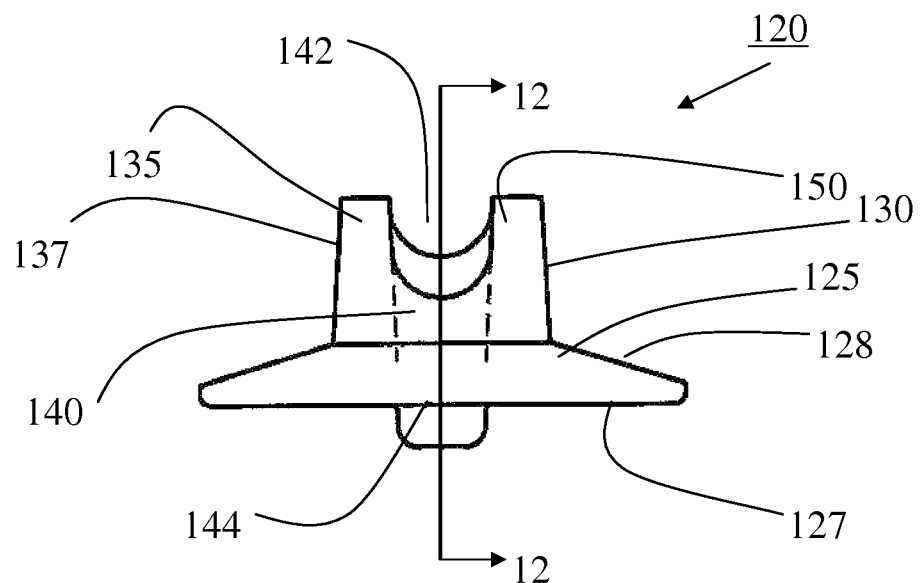
FIG. 10 is a front view of a second embodiment of a flanged hillside washer assembly.

FIG. 10 refers to a front view of flanged hillside washer assembly 120. The assembly includes a flange portion 125 and a hillside washer portion 130. The flange portion 125 has a flat base 127 on one end, an upper surface 128 on the opposite end and a channel 140 passing therethrough. The upper surface 128 of the flange 125 is oriented at an angle to the flat base 127. The hillside washer portion 130 has an upper curved surface 135 and outer side walls 150 extending downwardly from the curved surface to the upper surface 128 of the flange portion 125. The upper curved surface 135 includes an opening 142 that defines a first end of the channel 140. The channel 140 passes between the first opening 142 in the curved surface and terminates in a second opening 144 at the flat surface 127 of the flange portion such that the channel forms a continuous channel through the flanged hillside washer assembly 120.

Figure 11:
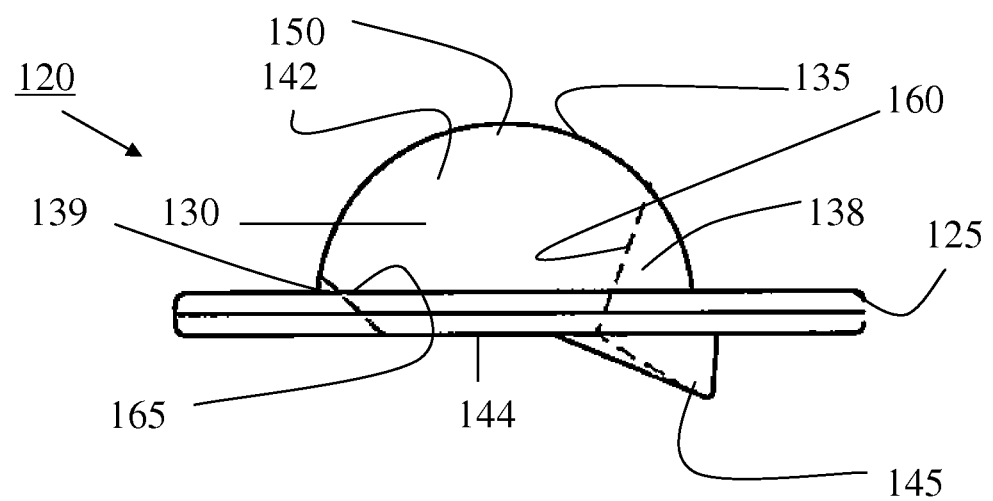
FIG. 11 is a side view of the flanged hillside washer assembly of FIG. 10.

Referring also to FIG. 11, which illustrates a side view of the hillside washer assembly 120, the assembly includes a nipple or a nub 145 that extends downwardly from the flat base 127 of the flange portion 125. The nub 145 is positioned at a distance away from the end of the flange 125 and has a width less than that of the flange base. The placement of the nub 145 is different from the placement of the nub 45 (FIG. 6). In FIG. 11, the nub is positioned below the hillside washer portion 130 and is a distance away from the outer edge of the outer edge of the flange portion 125. In FIG. 6, the nub 45 is positioned at the outer edge of the flange portion 25 and has only a portion positioned below the hillside washer portion 30.

Figure 12:
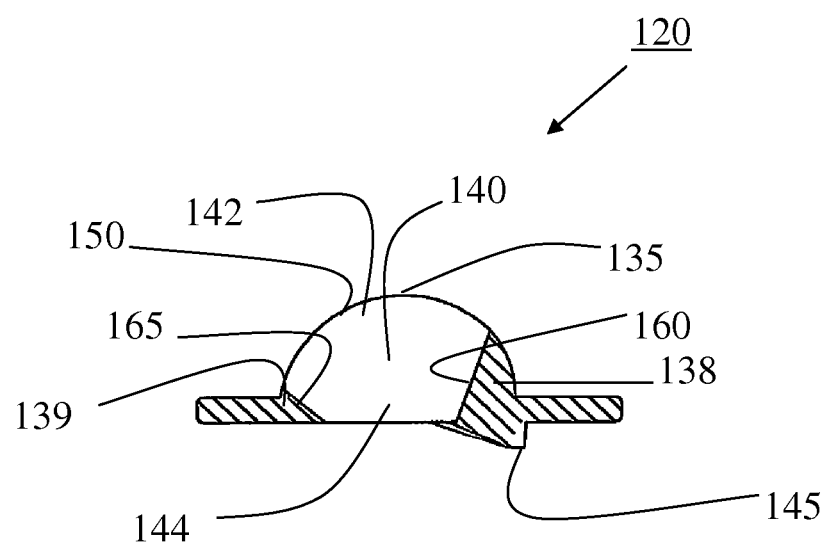
FIG. 12 is a cross sectional side view of the flanged hillside washer assembly of FIG. 10.

FIG. 12 refers to a cross sectional side view of a flanged hillside washer assembly with a channel 140 passing therethrough. Channel 140 has a varying breadth over its length to permit a wider range of pivoting motion for the rod passing through the channel. This particular embodiment of the invention involves a channel with decreasing breadth over its length. The channel 140 is defined by a pair of side walls 150, a rear wall 160, and a front wall 165. As seen from FIG. 10, the side walls 150 are generally vertical and provide a constant width of the channel 140 over its length. As can be seen in FIGS. 11 and 12, the rear wall 160 and the front wall 165 are oriented relative to each other at an angle such that the opening 142 is wider than the opening 144. This provides a greater pivoting angle for a mating rod passing through the channel 140.

FIGS. 11 and 12 illustrate that the combination of the side walls 150 and the wall 160 define a first solid region or land 138 of the hillside washer portion and the combination of the side walls 150 and the wall 165 define a second solid region or land 139 of the hillside washer portion. These solid regions 138, 139 advantageously provide support to the side walls 150 to prevent the walls from buckling or otherwise collapsing when great stresses are put upon the side walls during use. For example, if too much stress is placed against the curved surface 135 by use of a nut and washer with too much tension, a conventional hillside washer without such solid regions could buckle or collapse. By using the solid regions, the hillside washer can be made with thinner walls to save materials while still providing a hillside washer that is unlikely to collapse or buckle under typical operating conditions. The solid regions also provide limits to the amount of pivoting movement of a mating rod passing through the slot which advantageously may prevent stressed from being applied to the rod if the angle between the rod and flange portion is too low and the rod is pressed against opposite ends of the opening.

Figure 13:
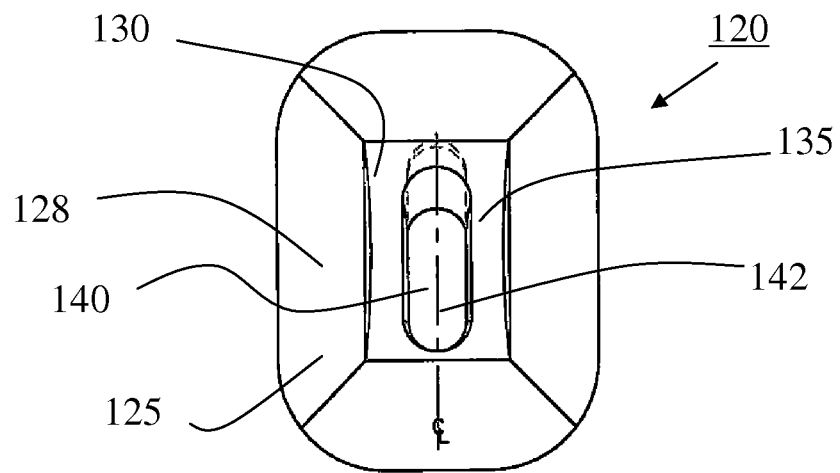
FIGS. 13 and 14 are top and side views, respectively, of the flanged hillside washer assembly of FIG. 10.
Figure 14:
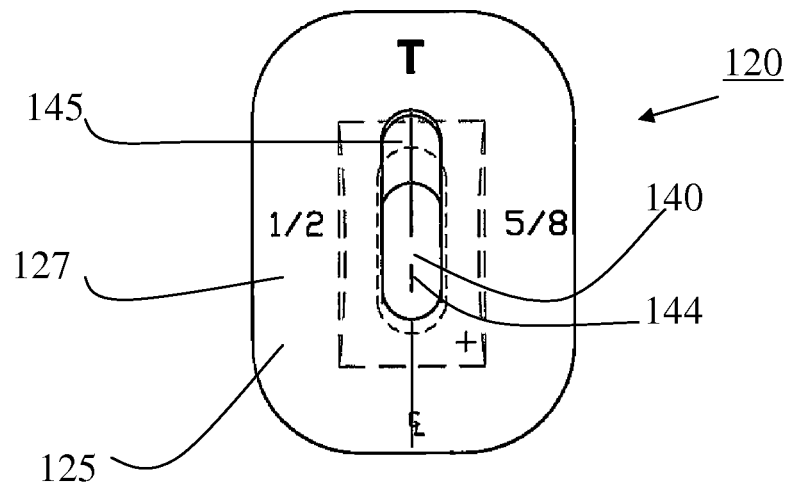

FIG. 13 refers to a top view of a flanged hillside washer assembly 120. The assembly includes the flange portion 125 and the hillside washer portion 130. The flange portion 125 has a flat base 127 on one end and an upper surface 128 on the opposite end. The upper surface 128 of the flange portion 125 is oriented at an angle to the flat base 127. The nub 145 is positioned on the flat base 127 of the flange portion 125 at a distance away from the edge of the flange. Referring also to FIG. 14, which illustrates a bottom view of the flanged hillside washer assembly 120 showing the flat base 127 of the flange portion 125, the channel opening 144 at the flat base 127 is narrower than the channel opening 142 at the curved surface 135 of the hillside washer portion 130. Although this shows the width of the channel 140 to vary across its length, such a variation is still within the range of a substantially constant width channel because a mating rod sized for the channel width would not have excessive widthwise play. While the width varies over the length of the channel in FIGS. 13 and 14, the width could vary of a sufficiently short portion such that the short portion sufficiently limits widthwise movement of the rod.

Comparing FIGS. 8 and 9 against FIGS. 13 and 14, several differences are noticeable. First, there is a difference in relative size of the hillside washer portion relative to the flange portion. FIGS. 8 and 9 show a hillside washer portion that takes up a great majority of the surface area of the flange portion while in contrast FIGS. 13 and 14 show a hillside washer portion that takes up approximately half of the surface area of the flange portion. In effect, the hillside washer assembly 20 has a smaller load distribution surface relative to the hillside washer portion in comparison to the hillside washer assembly 120. These differences in configuration permit a user select the most suitable flanged hillside washer assembly for the application. For example, some applications may require a narrow hillside washer assembly to fit within the metal framing while other applications may require a wider hillside washer assembly for better load distribution.

Another difference between the hillside washer assembly 20 and the hillside washer assembly 120 relates to the position of the nub relative to the outer edge of the flange portion. The assembly 120 has a flat base 127 having a surface that surrounds the nub. In contrast, the assembly 20 has a flat base 27 having a surface that surrounds a majority of the nub. In use, the flat base 27 will not be in contract with the metal framing at a position immediately adjacent to the nub while the flat base 127 will be in contact with the metal framing at all positions.

The flanged hillside washers 20 and 120 are used in the same manner for bracing a building structure. Accordingly, a description of the use of the flanged hillside washer 20 is equally applicable to that of flanged hillside washer 120 and the use of the flanged hillside washer 120 will not be repeated below after a description of the use of the flanged hillside washer 20.

In use, a worker positions the flanged hillside washer 20 against a metal bracing 4 such that the channel 40 in the washer is aligned with the channel or slot through the metal bracing. In placing the washer 20 against the bracing 4, the worker passes the channel 40 in the washer around the rod 7 by passing the threaded end 9 into the channel first. With the rod positioned within the channel, the worker advances the hillside washer 20 until it is in contact with the surface of the bracing surrounding the slot in the bracing with the nub 45 positioned within the slot. The worker then positions a conventional flat washer 10 and nut 11 onto the threaded end 9 and tightens the nut 11 until the washer 10 is firm pressed against the curved surface 50. Because the curved surface 50 is smooth, the washer 10 will be capable of being continuously positioned along the length of the curved surface no matter what angle the rod 7 makes with the hillside washer 20.

This continuous positioning advantageously ensures that the washer 10 and nut 11 are positioned flush against the curved surface such that the flat bottom surface 27 of the hillside washer will be flush against the surface of the bracing. If continuous positioning of the washer and nut were not possible, the curved surface would be positioned against the washer 10 and nut 11 based not on a positioning of the flat surface 27 against the bracing but instead based on the few positions in which the washer 10/nut 11 combination can be placed against the curved surface 50. As a consequence, the flanged hillside washer 20 will not be in as optimal a position against the bracing as would be expected if the orientation of the rod and hillside washer 20 was controlling the placement of the hillside washer 20 against the bracing. In such a sub-optimal positioning, the flat surface 27 is positioned at an angle to the surface of the bracing such that only a portion of the flat surface is in contact with the bracing. Consequently, a greater amount of stress will be imparted on that reduced area of the interface between the flat surface 27 and the bracing. The inventor's flanged hillside washer, in contrast, should be flush against the bracing such that the stress is spread generally equally over the entire surface of the flange portion against the bracing.

Further, because the width of the channel 40 is generally constant or of little variation over a portion of its length, the rod 7 is firmly seated within the channel 40 such that there is little widthwise movement of the rod. Because the widthwise movement has been addressed by use of a substantially constant width over a portion of the length of the channel, the worker does not need to use a specialized washer around the rod 7 to seat the rod firmly within the channel.

The flanged hillside washers described herein can be fabricated in a number of manners. For example, the washers can be molded, cast, machined, etc. A variety of materials are suitable for this application, including metals and plastics, and depending upon the anticipated load on the washer. The choice of metal for the washer material is preferred. A suitable metal for use in the washer is iron. Specific irons that can be used include ductile irons such as 65-45-12 ductile iron.

Figure 15:
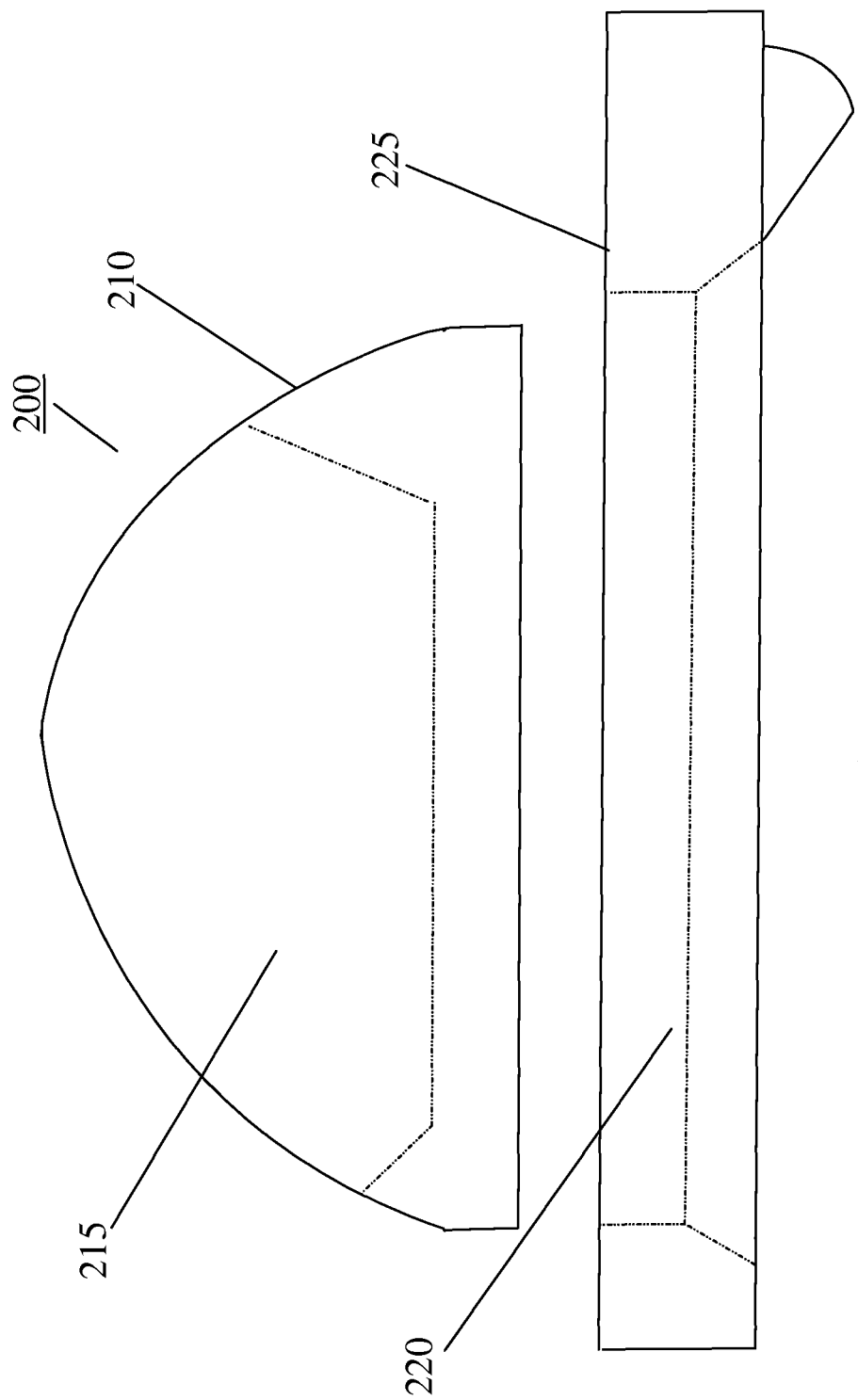
FIG. 15 is a side view of a hillside washer assembly with a separate hillside washer assembly and a separate flange portion.

Referring to FIG. 15, a flanged hillside washer assembly 200 is formed from a separate hillside washer portion 210 and a separate flange portion 225. The hillside washer portion is attachable to the flange portion. For example, the hillside washer portion is attachable to the flange portion using one or more of welding, threading, affixing, and interference fit. The washer portion has a channel 220 and the flange portion has a channel 215 that are configured to define a continuous channel through the flanged hillside washer assembly While several particular forms of the invention have been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention. Accordingly, it is not intended that the invention be limited, except as by the appended claims.

What is claimed is:

1. A flanged hillside washer assembly comprising:
   a flange portion and a hillside washer portion with a channel passing therethrough, the channel being defined by a first portion in the hillside washer portion and a second portion in the flange portion,
   the flange portion having a flat base on one end defining a plane, an upper surface and the second portion of the channel in the flange portion being defined by a first side wall portion and a second side wall portion defining the breadth of the channel in the flange portion;
   the hillside washer extending from the upper surface of the flange portion and having a smooth upper curved surface, a pair of side walls, a first side wall portion and a second side wall portion defining the breadth of the channel in the hillside washer portion, the first side wall portion in the flange portion and the first side wall portion in the hillside washer portion defining a first side wall and the second side wall portion in the flange portion and the second side wall portion in the hillside washer portion defining a second side wall, the channel extending from the smooth upper curved surface to the upper surface of the flange portion, and defining the channel passing between a first opening in the curved surface to the channel in the flange portion to form a continuous channel through the flanged hillside washer assembly, the two side walls being positioned on opposite sides of at least one solid region defining at least a part of the channel, extending from the curved surface to the upper surface of the flange portion and limiting a pivoting movement of a mating rod within the channel when the hillside washer assembly is used with a mating rod;
   at least a part of the first side wall portion and the second side wall portion within the flange portion being oriented at an angle to a vertical axis oriented perpendicularly to the plane of the flange;
   the flange portion extending outwardly beyond the side walls of the hillside washer portion to define an extended load distribution surface that is greater than the load distribution surface of the hillside washer portion by itself,
   the channel passing through the hillside washer portion and the flange portion having a breadth dimension and a width dimension over its length, the breadth varying over its length, and the width of the channel being substantially constant over at least a portion of its length sufficient to limit widthwise movement of a mating rod within the channel when the hillside washer assembly is used with a mating rod.

2. The flanged hillside washer assembly of claim 1, wherein the hillside washer is formed as one unit.

3. The flanged hillside washer assembly of claim 1, wherein the hillside washer is formed from a separate hillside washer portion and a separate flange portion, wherein the hillside washer portion is attached to the flange portion.

4. The flanged hillside washer assembly of claim 3, wherein the hillside washer portion is attached to the flanged portion using one or more of welding, threading, affixing, and interference fit.

5. The flanged hillside washer of claim 1, wherein the washer and the flange are configured to define a continuous channel.

6. The flanged hillside washer of claim 1, wherein the width of the channel at the portion of its length limits widthwise movement of a mating rod used with the hillside washer is configured to be a dimension to permit use of a standard mating rod used with the hillside washer without excessive widthwise movement of the mating rod within the channel.

7. The flanged hillside washer of claim 1, wherein the smooth curved surface is free of grooves or indentation along a widthwise dimension.

8. The flanged hillside washer of claim 7, wherein the smooth curved surface permits continuous positioning of a flat washer along the length of the curved surface.

9. The flanged washer assembly of claim 1, wherein the solid region defining a portion of the channel comprises a wall portion at an angle to the upper surface of the flange, the angle being sufficiently greater than 0 degree such that the breadth wise pivoting movement of a mating rod within the channel is limited by the wall portion.

10. The flanged hillside assembly of claim 1, wherein the opening in the flat base of the flange portion is of breadth that permits a mating rod to pivot within the channel such that the mating rod can be positioned against the wall portion of the solid region.

11. The flanged hillside washer assembly of claim 1, wherein the substantially constant width of the channel varies less than 10% over its length.

12. The flanged hillside washer of claim 1 wherein at least a part of the first side wall portion in the hillside washer portion is oriented along the vertical axis passing perpendicularly to the plane of the flange.

13. The flanged hillside washer of claim 1 wherein the second sidewall portion in the hillside washer portion is of a negligible length and the first portion of the channel is defined by the first sidewall portion and the smooth curved surface of the hillside washer portion.

14. A method of using the flanged hillside washer assembly of claim 1, the method comprising:
 providing the flanged hillside washer assembly;
 positioning the hillside washer against a metal frame member;
 passing the mating rod through the metal frame member and the channel in the hillside washer assembly;
 positioning a nut and an optional flat washer over the mating rod; and
 threading the nut on a threaded portion of the mating rod to secure the mating rod to the metal frame member.

15. The method of claim 14, wherein the width of the channel at the portion of its length is of a dimension that limits widthwise movement of a mating rod is within the channel.

16. The method of claim 14, wherein the smooth curved surface is free of grooves or indentation along a widthwise dimension.

17. The method of claim 14, further comprising a step of continuous positioning of a flat washer along the length of the curved surface.

18. The method of claim 14, further comprising a step of breadth wise pivoting movement of a mating rod within the channel, wherein the breadth wise pivoting is limited by a wall portion at an angle to the upper surface of the flange.

19. The method of claim 18, further comprising pivoting a mating rod within the channel such that the mating rod is positioned against the wall portion of the solid region.

20. A process for manufacturing the flanged hillside washer assembly of claim 1, the process comprising:
 casting the flange portion and the hillside washer portion to form the flanged hillside washer assembly as a unitary piece.

* * * * *